United States Patent [19]

Buck

[11] 4,002,271

[45] Jan. 11, 1977

[54] PROPORTIONING SYSTEMS
[75] Inventor: Erville C. Buck, Springfield, Oreg.
[73] Assignee: The Willamette Valley Company, Eugene, Oreg.
[22] Filed: May 21, 1975
[21] Appl. No.: 579,509
[52] U.S. Cl. .............................. 222/134; 222/145; 222/148
[51] Int. Cl.² .......................................... B67D 5/64
[58] Field of Search ............ 222/134, 26, 145, 148, 222/132, 250

[56] References Cited

UNITED STATES PATENTS

| | | | |
|---|---|---|---|
| 1,964,028 | 6/1934 | Boynton et al. ..................... | 222/26 |
| 3,790,030 | 2/1974 | Ives ................. | 222/148 X |
| 3,876,114 | 4/1975 | Hicks et al. ................... | 222/145 X |

FOREIGN PATENTS OR APPLICATIONS

| | | | |
|---|---|---|---|
| 2,203,983 | 8/1972 | Germany ........................... | 222/134 |
| 528,221 | 6/1955 | Italy .................................... | 222/134 |
| 395,285 | 12/1965 | Switzerland ....................... | 222/134 |

Primary Examiner—Stanley H. Tollberg
Assistant Examiner—Hadd Lane
Attorney, Agent, or Firm—Klarquist, Sparkman, Campbell, Leigh, Hall & Whinston

[57] ABSTRACT

Pistons of one pair of double-acting cylinders are connected to opposite sides of one point of a lever, one being driven by one chemical and the other supplying the chemical to a mixing and applying gun. A second pair of pistons of a second pair of double-acting cylinders are connected to the lever at a second point on the lever, a distance from the pivot point of the lever either the same or a predetermined fraction of the distance of the first-mentioned point from the pivot point of the lever, and are driven by a second chemical and supplying the second chemical to the gun, the cylinders all being of the same diameter. Valving actuated by the lever reverses the drives of the pistons automatically. In an alternate embodiment, supplies of the chemicals to the gun may be cut off and a solvent supplied to the gun to prevent the chemicals in the gun from setting up.

7 Claims, 6 Drawing Figures

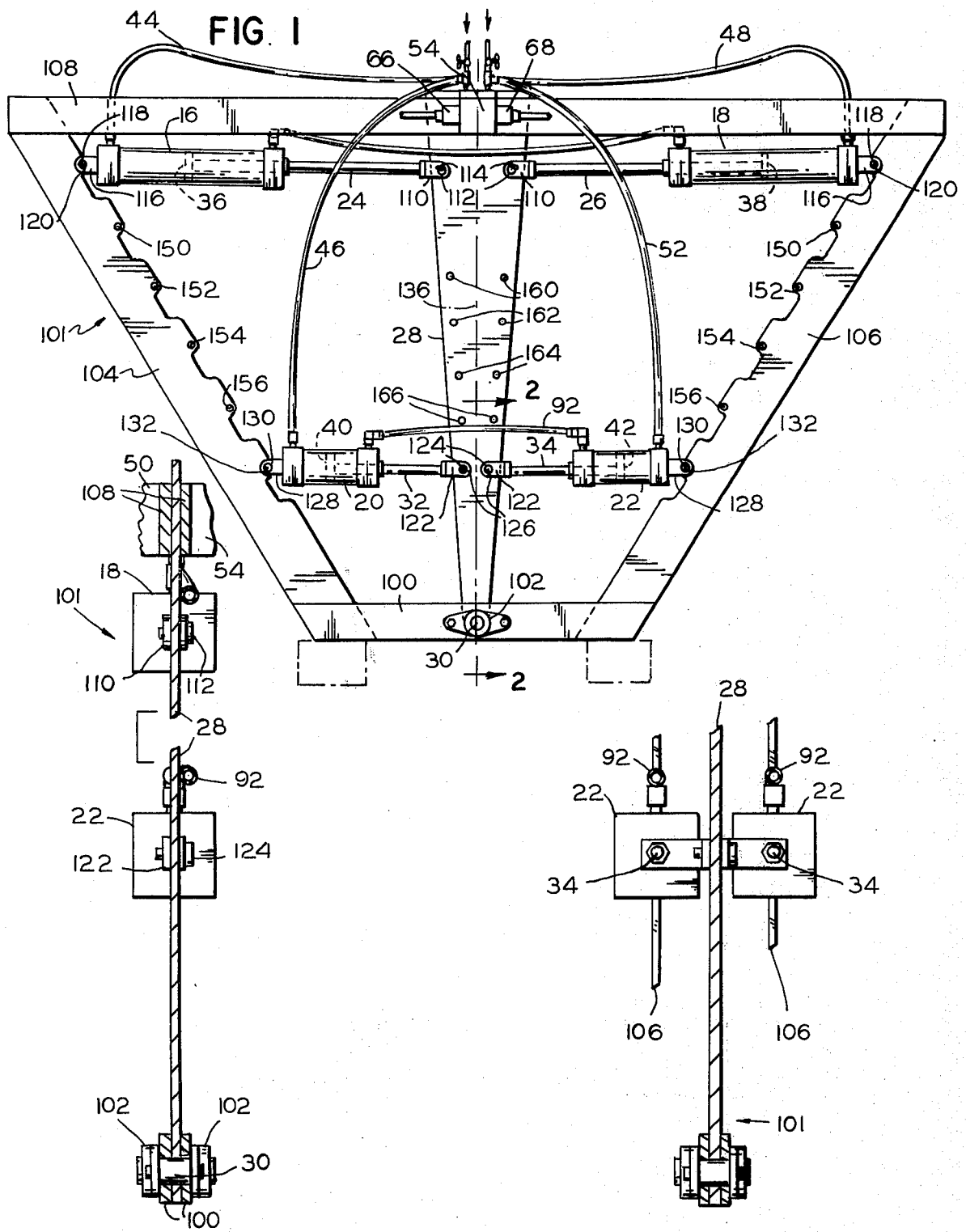

PROPORTIONING SYSTEMS

DESCRIPTION

This invention relates to improved chemicals proportioning systems, and has for an object thereof the provision of improved chemicals proportioning systems.

Another object of the invention is to provide a proportioning system including a lever for moving two cylinder pumps at a predetermined speed ratio.

A further object of the invention is to provide a proportioning system including a pair of cylinder pumps of the same diameter and drive means for driving the pumps at a predetermined speed ratio.

Another object of the invention is to provide a proportioning system wherein a resin and a hardening catalyst are supplied to a gun and selective control means for shutting off the supplies of the resin and the catalyst to the gun and simultaneously supplying a solvent to the gun to prevent hardening of the resin.

Another object of the invention is to provide an improved proportioning system including two pairs of opposed double-acting cylinders and means for synchronizing the drives of the two pairs of cylinders.

Another object of the invention is to provide an improved proportioning system including two pairs of opposed double-acting cylinders driven by and supplying two chemicals and connected to a lever at points so spaced from a pivot point of the lever as to provide feeds of the desired proportion.

In the drawings:

FIG. 1 is a front elevation view of a portion of a proportioning system forming one embodiment of the invention;

FIG. 2 is an enlarged, fragmentary, vertical sectional view taken along line 2—2 of FIG. 1;

FIG. 5 is an enlarged, fragmentary, vertical sectional view taken along line 5—5 of FIG. 4.

Figure 3:
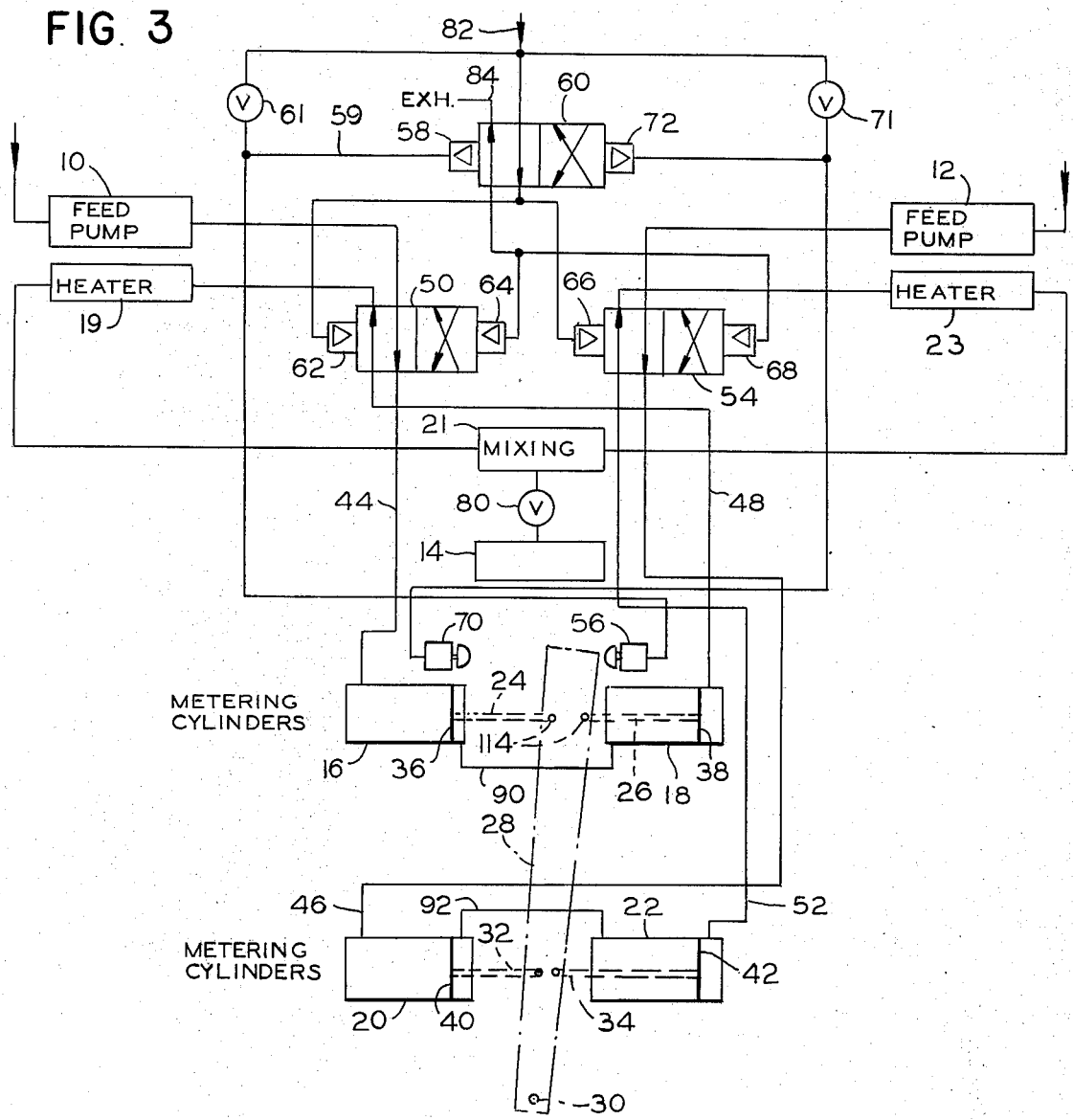
FIG. 3 is a schematic view of the system of FIG. 1.
Figure 4:
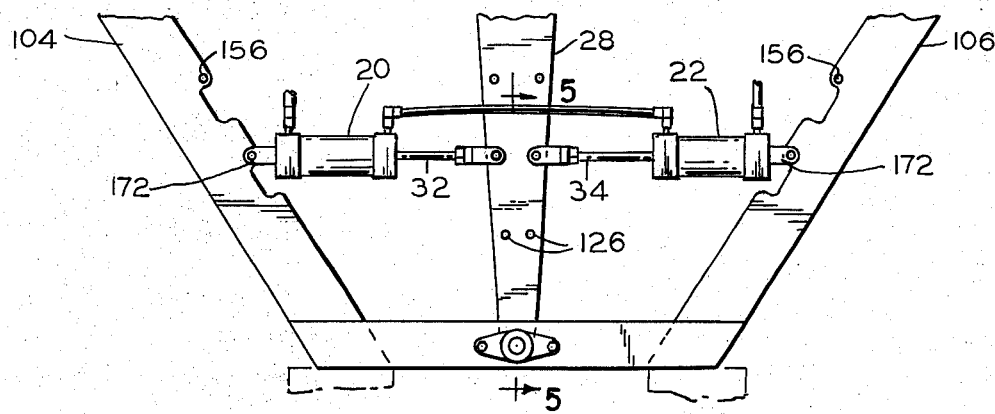
FIG. 4 is a fragmentary, front elevation view of a modification of the system of FIG. 1.

Referring now in detail to the drawings, there is shown in FIGS. 1–5 a proportioning system forming one embodiment of the invention and adapted to meter two chemicals in constant proportions from pumps 10 and 12 to an applicator or gun 14, which, in the embodiment shown, can be selectively operated to patch voids in plywood. Meter cylinders 16 and 18 alternately feed resin material to the gun 14 through a heater 19 and a mixer 21 at first rate of flow, and meter cylinders 20 and 22 alternately feed a hardening catalyst to the gun through a heater 23 and the mixer 21 at a rate of flow which is a precise fraction, one-third in the instance shown, of the first rate of flow. This precise proportioning is achieved by connecting piston rods 24 and 26 of the cylinders 16 and 18 to a lever 28 at a first distance from a pin 30 of the lever forming a pivot axis, connecting piston rods 32 and 34 of the cylinders 20 and 22 to the lever at a distance from the pivot axis one-third that of the first distance, and driving pistons 36, 38, 40 and 42 through the lever to eject the resin and the catalyst, the internal diameters of all the cylinders being the same.

During one-half of each operating cycle, the resin material is supplied continuously under pressure to the lefthand end of the cylinder 16 as viewed in FIGS. 1 and 3, through line 44, and the catalyst is supplied continuously under pressure to the lefthand end of the cylinder 20 through line 46. This causes the pistons 36 and 40 to move to the right to swing the lever 28 clockwise. The lever 28 moves the pistons 38 and 42 to the right to force resin material out of the righthand end of cylinder 18 to line 48 connected by valve 50 to the gun 14 and force catalyst out of the righthand end of the cylinder 22 to line 52 connected by valve 54 to the gun.

At the extreme of the clockwise travel of the lever 28, the lever engages and opens a bleeder valve 56, which then lowers pressure in line 59 supplied by a flow restricting needle valve 61 to lower pressure to pilot 58 of the pneumatic valve 60, and the valve 60 reverses its condition to actuate the valves 50 and 54, through pilots 62, 64, 66 and 68, to reverse their condition. This reversal causes the valves 50 and 54 to connect the lines 44 and 46 to the gun, and to connect the lines 48 and 52 to the pumps 10 and 12. This causes the pistons 38 and 42 to be forced toward the left, and they push the lever 28 counter-clockwise to push the pistons 36 and 40 to the left. The pistons 36 and 40 then force resin material and the catalyst to the gun through the valves 50 and 54, again at the same proportions, three to one for the adjustment shown. At the extreme counter-clockwise movement of the lever 28, it engages and opens bleeder valve 70 to lower pressure from flow restricting needle valve 71 to pilot valve 72 to again reverse the valves 60, 50 and 54 to reverse the drive of the lever.

The feed pumps 10 and 12 (FIG. 3) are of a well known type which stall when a valve 80 at the gun 14 is closed. Hence, whenever the valve 80 is closed, when a void is filled, the valves 10 and 12 do not feed their liquids on. When the valve 80 is reopened for another void, the pumps resume their pumping action.

A line 82 leads from a supply of air under pressure to the valves 60, 61 and 71, and an exhaust port 84 is provided in the valve 60.

The adjacent end portions of the cylinders 16 and 18 are filled with oil and are interconnected by hydraulic line 90. Similarly, the adjacent end portions of the cylinders 20 and 22 are filled with oil and are interconnected by hydraulic line 92. Thus, when the cylinders 16 and 20 are used as the drive cylinders, the oils to the right of the pistons 36 and 40 are placed under pressure and flow over into the lefthand ends of the cylinders 18 and 22 to help move the pistons 38 to the right. In the opposite condition, where the cylinders 18 and 22 are driving the lever 18 counter-clockwise, the oils are forced by the pistons 38 and 42 into the cylinders 16 and 20. These oils also prevent any corrosive action of the two chemicals, and make solid connections between the pistons 36 and 38 and between the pistons 40 and 42.

As best shown in FIGS. 1 and 2, the lever 28 is pivotally connected to bottom bars 100 of a stationary frame 101 by bearings 102. The bars are rigidly secured to equiangular sloping side bars 104 and 106, and upper bars 108 are connected to the upper ends of the side bars 104 and 106. The piston rods 24 and 26 are releasably connected to the lever 28 by clevises 110 and pins 112, which pass through holes 114 in the clevises and the lever. The opposite ends of the cylinders 16 and 18 are releasably connected to the side bars 104 and 106 by clevises 116 and pins 118 passing through holes 120 in the clevises and the side bars. Similarly, the ends of the pistons 32 and 34 are releasably connected to the lever by clevises 112 and pins 124, which pass through holes 126 in the clevises and the lever, and the cylinders 20 and 22 are releasably connected to the side bars 104 and 106 by the clevises 128 and pins 130, which pass through holes 132 in the clevises and the side bars.

The pair of holes 114 in the lever 28 are centered on radial lines intersecting the center of pin 30 and the holes 114 are each at the same distance from the center of the pin 30. The holes 114 are also spaced equal distances from centerline 136 of the lever. The holes 126 also are centered on the radial lines 134 the same distance from the center of the pin 30, and the holes 126 are in the lever 28 equidistant from the centerline 136. The distance each hole 114 is spaced from the center of the pin 30 is three times that of the distance between each hole 126 and the center of the pin 30. The holes 120 in the side bars 104 and 106 are both at the same height as the holes 114, and the holes 132 in the side bars are at the same height as the holes 126 to insure that the head ends of the cylinders 16, 18, 20 and 22 are always at least as high as the rod ends thereof (except the slight rise while the holes 114 and 126 pass over the pin 30). This aids bleeding of air from the cylinders from the lines 44, 46, 48 and 52, suitable bleeder valves (not shown) being connected to these lines which are connected to the head ends of the cylinders at the extreme upper portions thereof. Bleeder valves also are connected to the uppermost portions of the other lines and the valves 50 and 54 for getting all the air out of the systems.

If a lesser proportion than three to one is desired, the pins 112 and 118 (or 124 and 130) may be removed and the cylinders 16 and 18 (or 20 and 22) and piston rods 24 and 26 connected to one pair of pairs of holes 150 and 152, 154 and 156 in the side bars 104 and 106 and to a same level pair of holes 160, 162, 164 or 166 in lever 28. These alternate pairs of holes serve to provide desired proportions, the holes 152 and 162 being provided, for example, for two to one proportioning when the cylinders 20 and 22 and rods 32 and 34 are connected as shown in the drawings.

For one to one proportions, the cylinders 16 and 18 may be disconnected, and two pairs of side-by-side cylinders (FIGS. 4 and 5), corresponding to the cylinders 20 and 22 (only the cylinders 22 being shown in FIG. 5), are connected to the lever 28 and the side bars 104 and 106 at the same level. T-type clevises 170 connect the pairs of rods 32 and 34 to the lever and similar clevises 172 connect the pairs of cylinders to the side bars. One of the cylinders 20 is connected by an oil line 92 to one of the cylinders 22, and the other cylinder 20 is connected by another oil line 92 to the other cylinder 22. The operation is the same as in the first-described embodiment, except that one pair of the cylinders 20 and 22 is connected to the valves 50 and 54 like the cylinders 16 and 18 are shown connected in FIGS. 1–3.

EMBODIMENT OF FIG. 6

Figure 6:
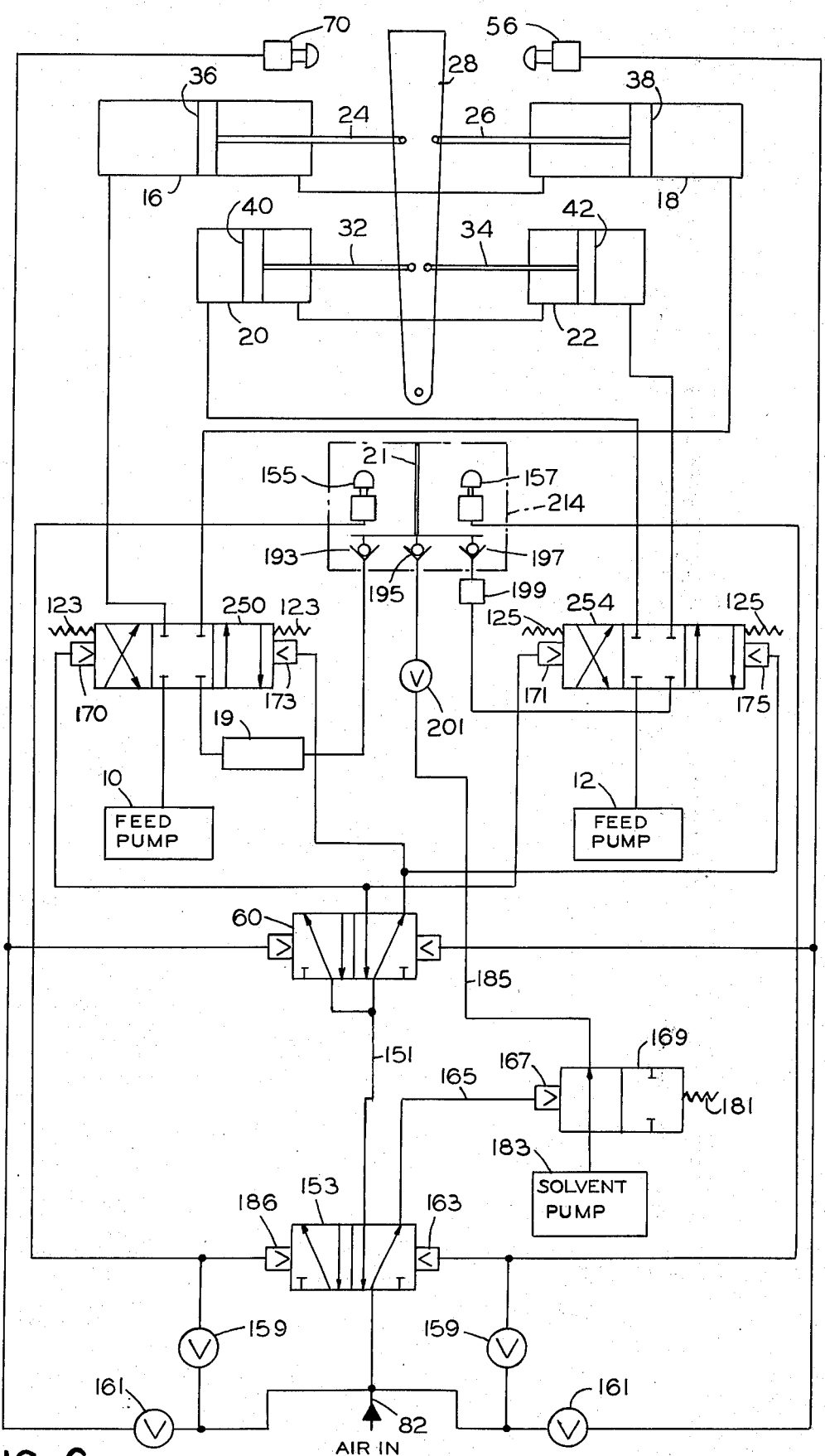
FIG. 6 is a schematic view of a proportioning system forming an alternate embodiment of the invention.

A chemicals metering system forming an alternate embodiment of the invention and shown in FIG. 6 is similar to that of FIGS. 1–3, and includes pumps 10 and 12 supplying two chemicals to an applicator or gun 214. Meter cylinders 16 and 18 alternately feed resin through a heater 19 and a mixer 21 at one rate of flow and meter cylinders 20 and 22 alternately feed a catalyst to the gun precisely proportioned. The cylinders have pistons 36, 38, 40 and 42, and rods 24, 26, 32 and 34 connected to lever 28, like the corresponding elements of the system of FIG. 1. Valves 250 and 254 which are like the valves 50 and 54 but have their spools normally held in centered blocking conditions by springs 123 and 125, control the flows of the resin and catalyst to the gun. The valves 250 and 254 are controlled by valve 60 which, in turn, is controlled by positioning or limit switch type of valves 56 and 70, like the corresponding valves of the system of FIG. 1.

Air under pressure may be supplied to the valve 60 from a line 151 leading from valve 153 having an air supply line 82 leading thereto. The valve 153 is controlled by manually actuated bleeder valves 155 and 157 mounted on the gun 214, the valves 155 and 157 being supplied with air under pressure through flow-restricting needle valves 159, similar needle valves 161 being in the supply lines to the valves 56 and 70. When it is desired to patch a void in a sheet of plywood, the operator presses open momentarily the valve 157 to reduce pressure to pilot valve 163 and the valve 153 is shifted to the right to connect the line 151 to the air supply line 82 and to exhaust line 165 to pilot valve 167 of valve 169. The air under pressure then flows through the valve 60 to, depending on the setting of the valve 60, either the lefthand pilots 170 and 171 or righthand pilots 173 and 175 to shift the valves 250 and 254 from centered positions both either to the right or to the left, and the resin and catalyst flow to the cylinders 16 or 18 and 20 or 22. The shifting of the valve 153 to the right also connects pilot 167 to exhaust, and spring 181 shifts the valve 169 to the left to cut off flow of solvent from a pump 183 to a line 185 leading to the gun 114.

When it is desired to stop the patching operation, to prevent hardening of the resin in the gun, the operator momentarily opens the valve 155 to decrease pressure in pilot 186 to cause the valve 153 to be shifted back to the left to the position shown. This cuts off air to the line 151 to cut off air from the pilots 170 and 171 or the pilots 173 and 175 to cause the valves 250 and 254 to be shifted to their centered blocking or shut off positions. It also connects the line 82 to the pilot 167 to shift the valve 169 to the right against the action of spring 189, and solvent under pressure is supplied by one solvent pump 183 to the line 185 and the solvent is supplied to the mixer 21 and gun 14 to prevent hardening of the portion of the resin in the mixer and the gun. Check valves 193, 195 and 197 are provided in the lines from the valves 250, 254 and 169 to the mixer and gun so that no backing up occurs and a manually operable shut-off valve 201 is provided in the line 185 to shut off the flow of solvent after a sufficient supply has been fed to the mixer and the gun. A heater 199 is provided for the catalyst.

What is claimed is:
1. In a proportioning system,
 a frame,
 a lever pivotally connected at one end thereof to the frame for pivotal movement about a fulcrum point,
 a first pair of double-acting cylinder pumps each of a predetermined diameter and each including a cylinder and a piston,
 the frame including a pair of arms on opposite sides of the fulcrum point,
 means connecting the outer ends of the cylinders pivotally to the arms and rods of the pistons pivotally to the lever at opposite sides of the lever and at equal distances from the fulcrum point to mount the cylinder pumps in opposed positions, a second pair of cylinder pumps each of a predetermined diameter and each including a cylinder and a piston, means connecting the outer ends of the cylinders of the second pair pivotally to the arms and rods of the pistons of the second pair pivotally to the lever at opposed sides of the lever and at equal distances from the fulcrum point, the last-mentioned distances being a predetermined proportion of the first-mentioned distances, first supply means forming a source of a first liquid under pressure, second supply means forming a source of a second liquid under pressure, mixing means, and valve means for alternately connecting the first supply means to the outer ends of the first pair of cylinders and connecting the outer ends of the first pair of cylinders alternately to the mixing means and for alternately connecting the second supply means to the outer ends of the second pair of cylinders and connecting the outer ends of the second pair of cylinders alternately to the mixing means.

2. The proportioning system of claim 1 wherein said distances are all equal.

3. The proportioning system of claim 2 wherein said diameters are all equal.

4. The proportioning system of claim 1 wherein said diameters are all equal.

5. The proportioning system of claim 4 wherein the first-mentioned distances are different from the second-mentioned distances.

6. The proportioning system of claim 1 including third supply means forming a source of a cleaning fluid, and second valving means operable to shut off the mixing zone from the cylinders and connect the cleaning fluid to the mixing means.

7. The proportioning system of claim 1 wherein the frame has a base to which the lever is pivoted and from which the arms extend, the arms having a plurality of pairs of connecting portions spaced therealong to which the cylinders can be selectively connected.

* * * * *